(12) United States Patent
Sasaki et al.

(10) Patent No.: US 6,611,892 B1
(45) Date of Patent: Aug. 26, 2003

(54) NETWORK BUS BRIDGE AND SYSTEM

(75) Inventors: Yuhi Sasaki, Yokohama (JP); Toshiaki Shinohara, Omiya (JP); Kengo Tsuzuki, Machida (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/578,467

(22) Filed: May 26, 2000

(30) Foreign Application Priority Data

Sep. 10, 1999 (JP) .......................................... 11-257636

(51) Int. Cl.[7] .............................................. G06F 13/38
(52) U.S. Cl. .................. 710/306; 710/305; 370/395.52; 370/395.65; 370/401; 370/466; 725/12; 725/76; 725/77
(58) Field of Search ................................ 710/305–317; 370/395.52, 395.65, 401, 466; 725/12, 77, 76

(56) References Cited

U.S. PATENT DOCUMENTS

| 4,647,980 | A | * | 3/1987 | Steventon et al. | .......... 348/837 |
| 4,763,360 | A | * | 8/1988 | Daniels et al. | ............. 455/3.06 |
| 4,774,514 | A | * | 9/1988 | Hildebrandt et al. | ......... 340/971 |
| 4,835,604 | A | * | 5/1989 | Kondo et al. | .................. 725/76 |
| 4,866,515 | A | * | 9/1989 | Tagawa et al. | ................ 725/77 |
| 4,896,209 | A | * | 1/1990 | Matsuzaki et al. | ............ 725/12 |
| 6,014,381 | A | * | 1/2000 | Troxel et al. | .......... 370/395.52 |

FOREIGN PATENT DOCUMENTS

| EP | 0836299 | 4/1998 |
| JP | 5175962 | 7/1993 |
| WO | 9811726 | 3/1998 |

OTHER PUBLICATIONS

European Search Report dated Sep. 17, 2002.

\* cited by examiner

*Primary Examiner*—Rupal Dharia

(57) ABSTRACT

The two-way transmissions are performed between a first bus and a usual portal of a first full-duplex 3-portal bridge and between a second bus and a usual portal of a second full-duplex 3-portal bridge, respectively. The one-way transmission of an isochronous packet and an asynchronous stream packet is performed between transmission and reception portals of the first full-duplex 3-portal bridge and reception and transmission portals of the second full-duplex 3-portal bridge. The first full-duplex 3-portal bridge and the second full-duplex 3-portal bridge perform a conversion between the asynchronous stream packet and an asynchronous packet if necessary.

40 Claims, 13 Drawing Sheets

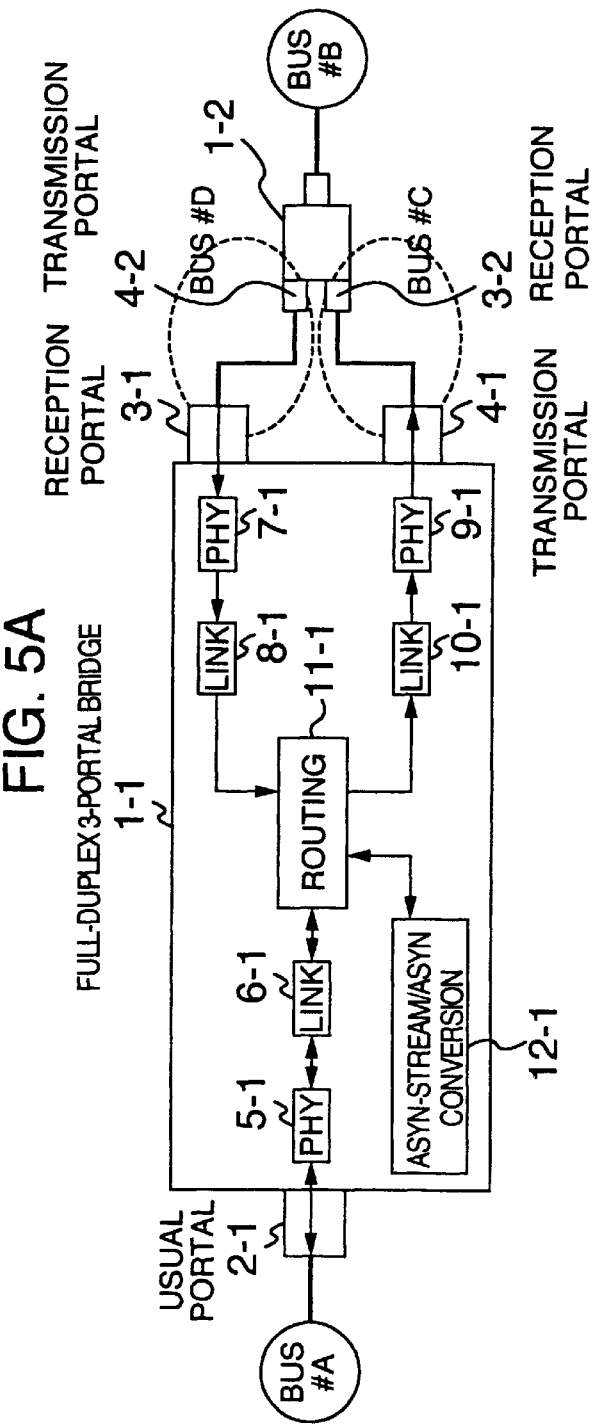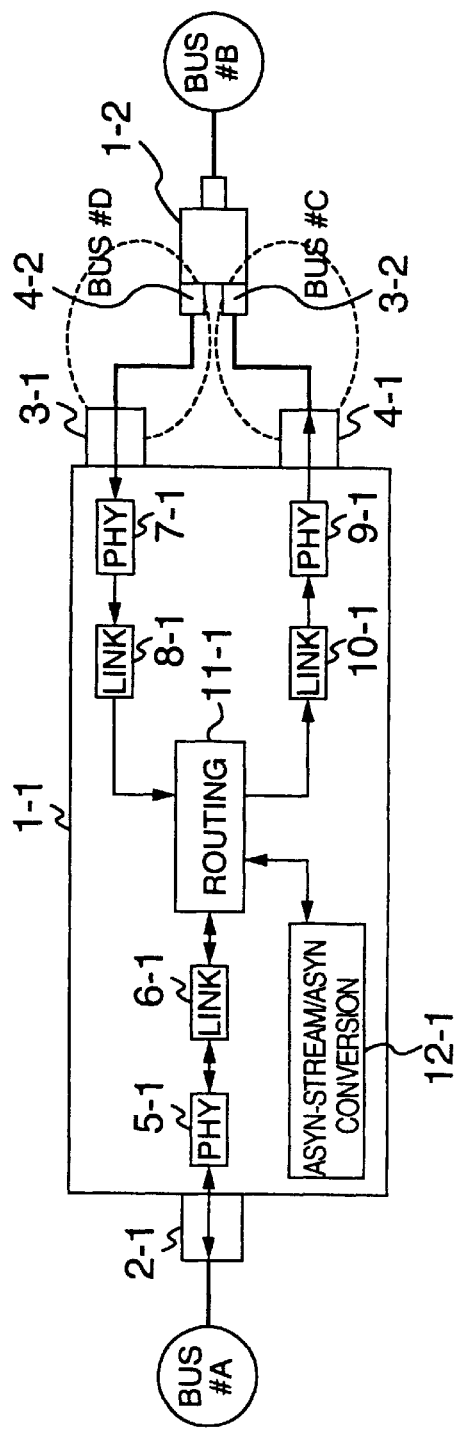
FIG. 5A
FIG. 5B

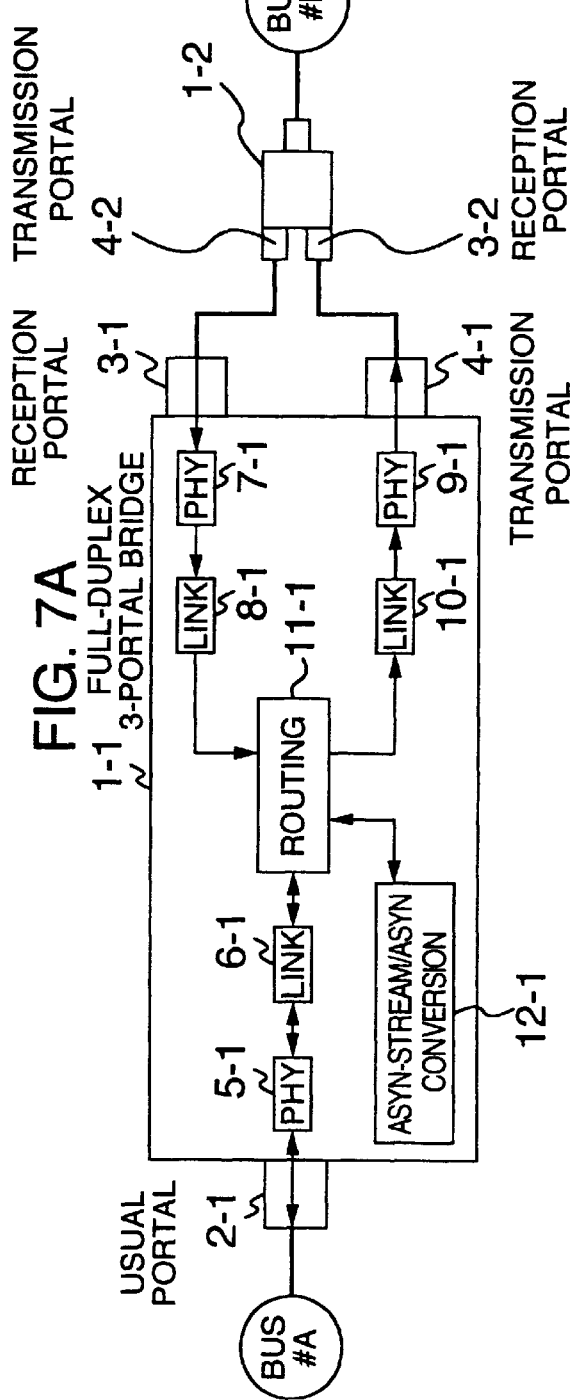
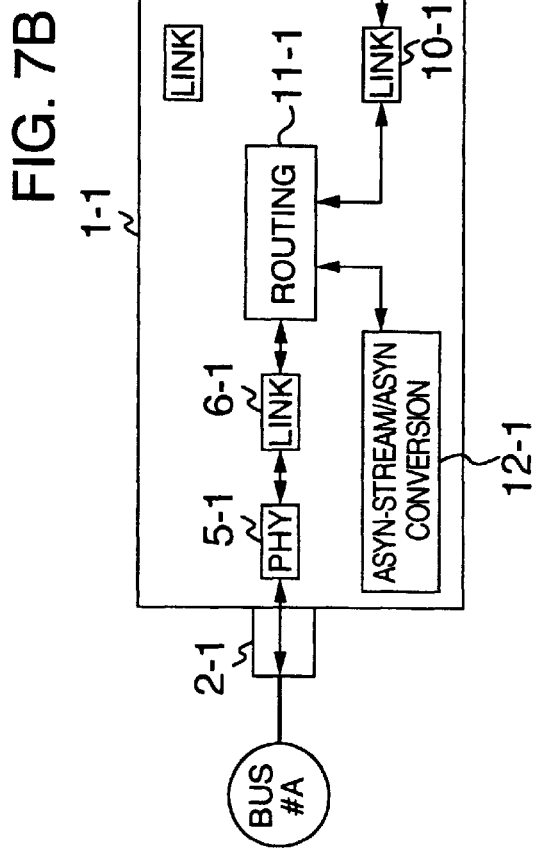

FIG. 8A
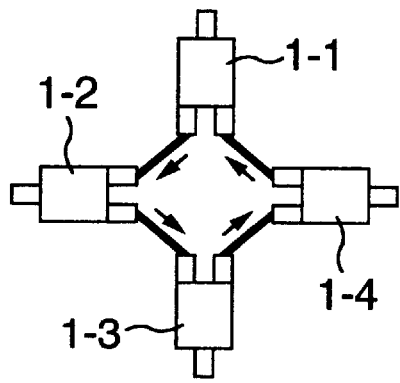
FIG. 8B
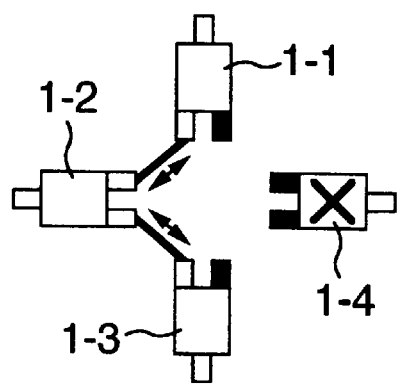
FIG. 9
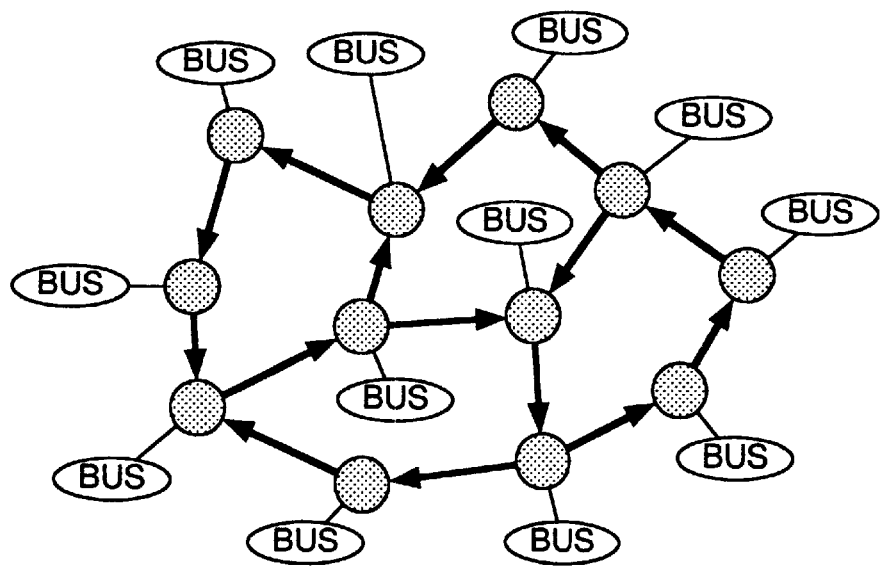
 FULL-DUPLEX MULTI-PORTAL BRIDGE

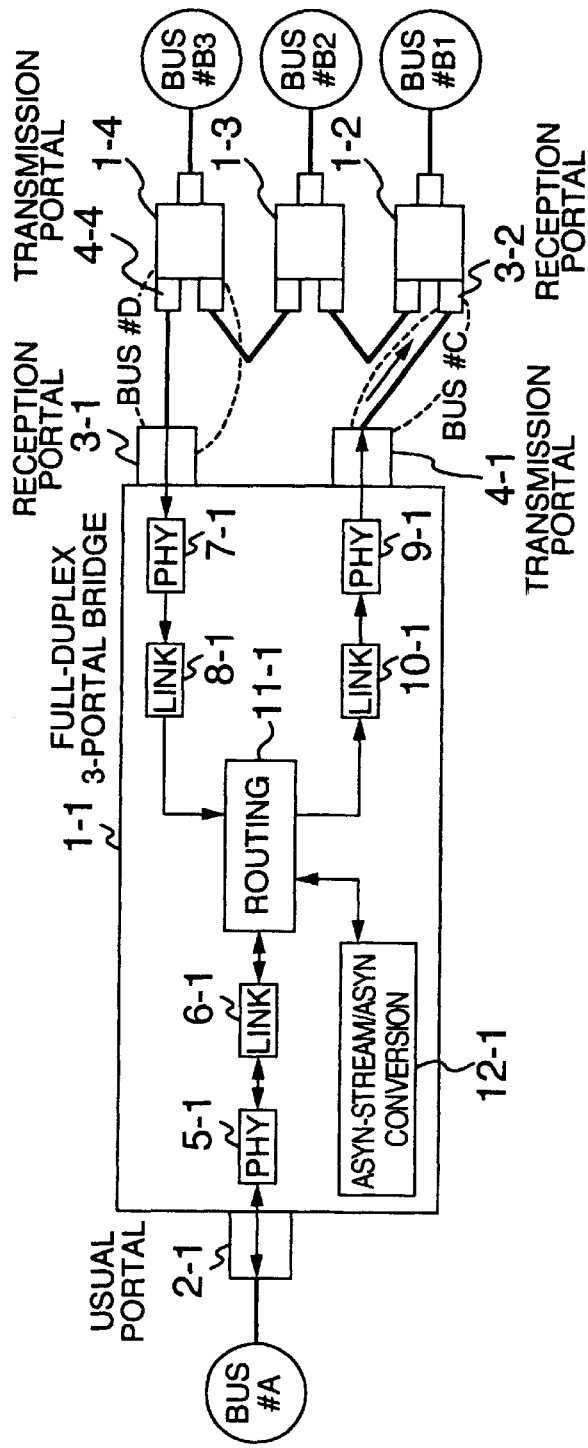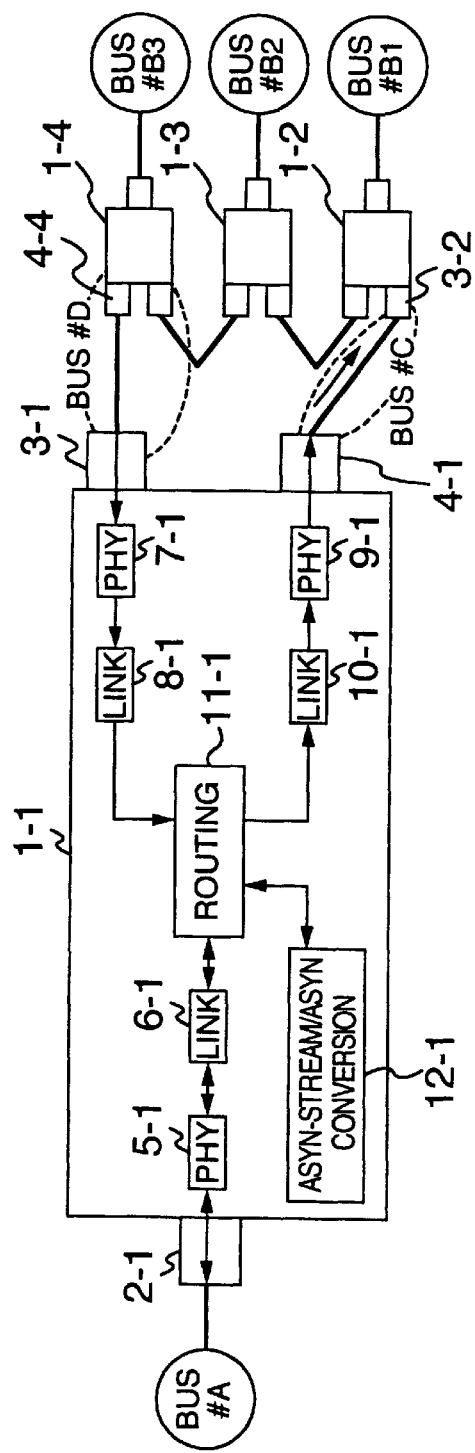
FIG. 10A
FIG. 10B

NETWORK BUS BRIDGE AND SYSTEM

BACKGROUND OF THE INVENTION

1. Field of the Invention

The present invention relates to a network bus bridge and a network system using the network bus bridge, and more particularly to a network bus bridge and a network system which are capable of preventing the bus bandwidth use efficiency from being lowered by the transmission delay.

2. Description of the Related Art

A network having the IEEE1394 high-speed serial bus (hereinafter simply called the "IEEE1394 bus") has been paid attention as one of the bus type networks. The IEEE1394 bus has a number of characteristic features such as automatic setting of node IDs, hot plug and play, and isochronous mode suitable for transmission of moving-image data, and has been adopted as a bus for transmitting digital image data.

For the usual arbitration used in IEEE1394-1995, a root node issues a transmission permission. In P1394b, the transmission order of nodes is determined by a procedure called the "BOSS arbitration". For the BOSS arbitration, a node called "BOSS" issues the transmission permission. After the node issues the transmission permission, this node is not the BOSS any more, but the node received the transmission permission becomes a new BOSS.

In other words, the BOSS arbitration is one kind of token passing. Not becoming the BOSS by giving the transmission permission to another node corresponds to "tossing a token", and becoming the BOSS by receiving the transmission permission corresponds to "receiving a token".

A different point of the BOSS arbitration from the general token passing is that in the token passing the circulation order of the token is predetermined, whereas in the BOSS arbitration the node becoming the BOSS (receiving a token) is determined each time through competition. Namely, in the BOSS arbitration, a node which does not desire to transmit data does not become the BOSS (i.e., does not receive a token).

Generally, a half-duplex bus type network has advantages that broadcast is easy and the network topology is flexible, but has disadvantages that other nodes cannot transmit data while one node transmits a frame of a packet. The period while a node transmits a frame is more precisely "a period from when a frame starts being transmitted to when it becomes that the next frame can be transmitted". This period can be generally defined as a period from the time instance when a node starts transmitting a frame to when the transmitted frame extinguishes from a bus. Namely, when the bus is broadened (i.e., the maximum value of a delay between nodes is set large) for long distance transmission, the transmission delay time becomes long. As a result, the "period from when a frame starts being transmitted to when it becomes that the next frame can be transmitted" is prolonged by the transmission delay. This is apparent from the following equation [1] which indicates the time for the same size frame to be transmitted to the whole bus:

(Frame size)/(Transmission Rate)+Transmission delay    [1]

It can be understood that when the transmission delay occurs, an additional time equal to the transmission delay requires transmitting the same size frame, so that the occurrence of the transmission delay lowers the bandwidth efficiency. This problem is troublesome in that the higher the transmission rate is, the larger the influence of the transmission delay is, as seen from the equation [1].

In order to cope with this lower efficiency, a large frame is generally used. Because the influence of the transmission delay can be mitigated as the frame size becomes large, as apparent from the equation [1]. The large frame can therefore suppress the transmission efficiency from being lowered.

A network using the IEEE1394 bus is one of the half-duplex bus type networks. This network therefore has the characteristics that if the transmission distance is elongated to generate the transmission delay, the bandwidth efficiency lowers.

In the BOSS arbitration of P1394b, the BOSS can transmit a frame. After the BOSS transmits the transmission permission to another node after transmitting the frame, it is not a BOSS any more. The node received the transmission permission becomes a new BOSS and can transmit a frame immediately thereafter. Namely, in P1394b, a period while a frame cannot be transmitted is a period from the time instant when the BOSS transmits the transmission permission to the time instant when another node receives the transmission permission and becomes the new BOSS. During this period, there is no BOSS on the bus. Therefore, any frame will not be transmitted. This will be described in more detail with reference to FIGS. 13 and 14.

FIG. 13 is a diagram showing an example of a network system using the IEEE1394 bus, and FIG. 14 is a diagram showing an example of the operation timing of the network system. In the network system shown in FIG. 13, four nodes "A", "B", "C" and "D" are connected to the IEEE1394 bus. The node "B" is a cycle master. In FIG. 14, a both-head arrow in the uppermost area indicates a transmission cycle of 125 μs. During the time duration "B", "C", "D", "A", "D", "B", "C" and "A" indicated by both-head arrows in the second uppermost area, nodes corresponding to these alphabets become the BOSS. Namely, they become the BOSS in the order of node "B"→node "C"→node "D"→node "A"→node "D"→node "B"→node "C"→node "A". Idle periods caused by the transmission delay are indicated by both-head arrows (in the third uppermost area) during the period when each of the nodes becomes the BOSS. The transmission timings of nodes "A", "B", "C" and "D" are indicated by "A", "B", "C" and "D" affixed to the leftmost area in FIG. 14.

The operation of the network system shown in FIG. 13 will be described. After the node "B" which is the cycle master and the BOSS transmits a cycle start packet CS on the bus, it transmits a transmission permission token on the bus. The cycle start packet CS and the transmission permission token are flowing on the bus and are received by the nodes "A", "C" and "D". The node "C" receives the transmission permission token to become the BOSS. There-after, the node "C" transmits an isochronous packet IsC and the transmission permission token on the bus. Similarly, the nodes "D" and "A" become thereafter the BOSS in this order. The node "D" transmits an isochronous packet IsD and the transmission permission token on the bus, and the node "A" transmits an isochronous packet IsA and the transmission permission token on the bus. After the nodes "B", "C", "D" and "A" sequentially transmit isochronous packets on the bus in the above manner, the nodes "D" and "C" sequentially transmit asynchronous packets AD and AC. In transmitting the asynchronous packet, it is determined that the node which receives the asynchronous packet returns an acknowledgement packet to the transmitting node. Therefore, for the asynchronous packet AD, the node "B" becomes the BOSS and returns the acknowledge packet to the node "D", and for the asynchronous packet AC, the node "A" becomes the BOSS and returns the acknowledge packet to the node "D".

It can be understood from the above explanation that the idle time period is a period while the BOSS does not exist. In the case of the token passing, the idle period is a period while a token flows on the network. Therefore, the above-described general formula [1] becomes the following formula [2] for the BOSS arbitration:

(Frame size)/(Transmission rate)+(Transfer time of transmission permission token)     [2]

In the case of the IEEE1394 bus, a long distance such as a large bus size will not cause any deterioration of the efficiency due to the long distance transmission delay if the nodes which become the BOSS (which desire to transmit) are concentrated in a narrow area. The reason is as follows. The idle time is a time for which the transmission permission token is transferred from the current BOSS to the next BOSS. Therefore, only the transmission delay between the nodes which become the BOSS (which desire to transmit) becomes an issue, and the bus size is not directly related to the efficiency. Namely, the following inequality [3] is established:

(Value of equation [1])≧(Value of equation [2])     [3]

However, it is generally rare that the nodes which become the BOSS (which desire to transmit) are concentrated in a narrow area of a broad bus. It is usual to consider that the nodes exist in an area from one end to the other end of the bus. The influence of the bus size is therefore hard to be reduced, so that it is not substantial that the value of equation [2] is much smaller than that of equation [1]. It can be said that the BOSS arbitration is much more efficient than the general token passing.

One approach to solving this problem of the low efficiency is to make large the frame size similar to the general network system. The larger the frame size is, the less the influence of the transfer time of the transmission permission token is.

However, the IEEE1394 bus is associated with a critical problem. As shown in FIG. 14, the IEEE1394 bus has the cycle of 125 $\mu$sec. Data transfer is executed by the repetitive transmission of a small frame in each cycle in order to suppress the generation of the jitter. For example, if data is to be transmitted at the bandwidth of 6 Mbps, it is necessary to transmit a frame having at least a size of 6 Mbps×125 $\mu$s=750 bits=94 bytes (4 bytes+header size) in one cycle. This cycle poses the following limit of the IEEE1394 bus expressed by the following inequality:

(Total of values of equation [2] for all frames to be transmitted in one cycle)≦125 $\mu$s     [4]

A more specific representation of inequality [4] becomes the following equation:

(Number of packets to be transmitted in one cycle)=$_k^{93}$ [(Frame size of packet k)/(Transmission rate)+(Transfer time of transmission permission token from BOSS(k) to BOSS(k+1))≦125 $\mu$s     [5]

Namely, if the frame size is to be made large, it is necessary not only to satisfy the limit of a frame size defined by the specification but also to satisfy the condition defined by inequality [5]. It means that as the number of frames to be transmitted in one cycle increases too large, the frame size cannot be made large. Since the IEEE1394 bus has this problem of an inability to make the frame size large, another solution method is required.

SUMMARY OF THE INVENTION

The present invention has been made in order to solve the above problems. An object of the present invention is to provide a network bus bridge and a network system which are capable of preventing the bus bandwidth use efficiency from being lowered by the transmission delay in the half-duplex bus type network system such as the IEEE1394 bus.

The first network system of the present invention comprises: one transmission node; one or more reception nodes; and a half-duplex bus connected between the transmission node and the reception nodes. With this configuration, the one-way transmission is performed from the transmission node to the reception node, so that the bus bandwidth use efficiency can be prevented from being lowered by the transmission delay and the transmission efficiency can be improved.

The first network bus bridge of the present invention comprises one or more transmission portals. With this configuration, the one-way transmission from the transmission portal to a half-duplex bus becomes possible.

The second network bus bridge of the present invention comprises one or more reception portals. With this configuration, the one-way transmission from a half-duplex bus to the reception portal becomes possible.

The second network system of the present invention comprises: a first network bus bridge having one transmission portal and one transmission/reception portal; a plurality of second network bus bridges each having one reception portal and one transmission/reception portal; and a half-duplex bus connected between the transmission portal and the reception portal. With this configuration, by realizing the one-way transmission between the transmission portal of the first network bus bridge and the reception portal of the second network bus bridge, the transmission efficiency can be improved.

The third network system of the present invention comprises:

a first network bus bridge having one transmission portal and one transmission/reception portal;

a second network bus bridge having one reception portal and one transmission/reception portal;

a third network bus bridge having one transmission portal and one transmission/reception portal; and a fourth network bus bridge having one reception portal and one transmission/reception portal, wherein the transmission portal of the first network bus bridge and the reception portal of the second network bus bridge is connected via a half-duplex bus;

the transmission portal of the third network bus bridge and the reception portal of the fourth network bus bridge is connected via a half-duplex bus;

the transmission/reception portal of the first network bus bridge and the transmission/reception portal of the fourth network bus bridge is connected via a half-duplex bus; and the transmission/reception portal of the second network bus bridge and the transmission/reception portal of the third network bus bridge is connected via a half-duplex bus.

With this configuration, by realizing the one-way transmission from the transmission portal to the reception portal, the transmission efficiency can be improved. Also, by providing a pair of the one-way transmissions in the reverse direction, the two-way transmission with the high transmission efficiency can be realized.

The third network bus bridge of the present invention comprises: one or more transmission portals; and one or more reception portals. With this configuration, the one-way transmission from the transmission portal to a half-duplex bus and the one-way transmission from the reception portal to the half-duplex bus become possible.

The fourth network system of the present invention comprises two third network bus bridges, wherein the transmission and reception portals of one of the two third network bus bridges are connected to the reception and transmission portals of the other via half-duplex buses, respectively; and the transmission/reception portals of the two third network bus bridges are connected via a half-duplex bus. With this configuration, by realizing the one-way transmission from the transmission portal to the reception portal, the transmission efficiency can be improved. Also, by providing a pair of the one-way transmissions in the reverse direction, the two-way transmission with the high transmission efficiency can be realized.

The fourth network system of the present invention comprises three or more third network bus bridges, wherein the connections of the transmission and reception portals of one of two adjacent network bus bridges to the reception and transmission portals of the other of the two adjacent network bus bridges via half-duplex buses are repeated to form a loop along which data flows in one direction. With this configuration, by realizing the one-way transmission from the transmission portal to the reception portal, the transmission efficiency can be improved and the loop type transmission can be realized.

BRIEF DESCRIPTION OF THE DRAWINGS

FIGS. 5A and 5B are block diagrams illustrating the operation of the network system shown in FIGS. 4A and 4B;

FIGS. 7A and 7B are diagrams illustrating the operation to be executed when a failure occurs in the network system shown in FIGS. 5A and 5B;

FIGS. 8A and 8B are diagrams showing another structure of the network system having the full-duplex 3-portal bridge shown in FIG. 3;

FIG. 9 is a diagram showing still another structure of the network system having the full-duplex 3-portal bridge shown in FIG. 3;

FIGS. 10A and 10B are block diagrams illustrating the operation of the network system shown in FIGS. 8A and 8B;

DETAILED DESCRIPTION OF THE EMBODIMENTS

Embodiments of the present invention will be described in detail with reference to FIGS. 1–12B.

(First Embodiment)

In the first embodiment of the present invention, one transmission node and one reception node are connected together by the IEEE1394 bus, and only the one-way transmission from the transmission node to the reception node is performed to improve the transmission efficiency.

Figure 1:
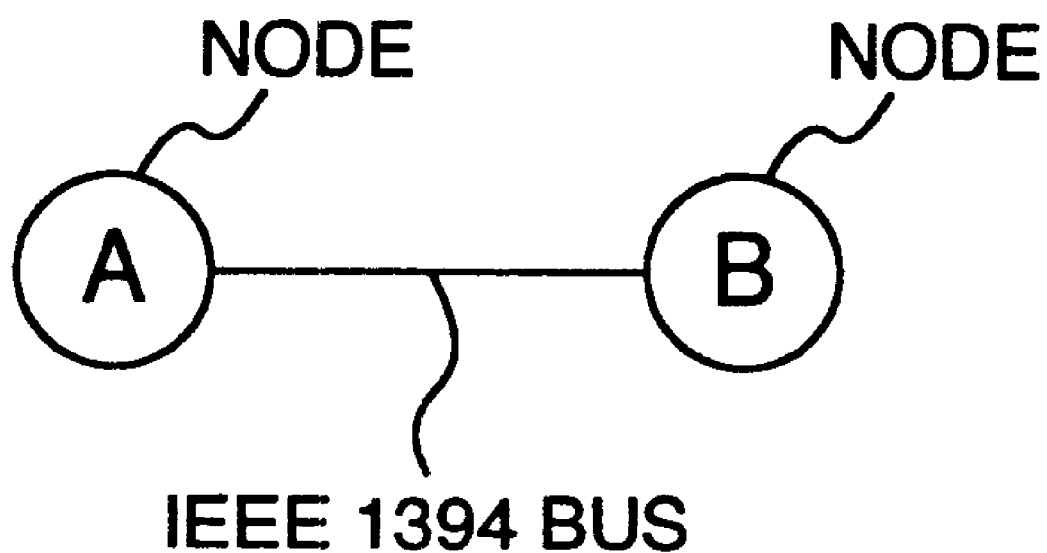
FIG. 1 is a schematic diagram showing a network system according to a first embodiment of the present invention.
Figure 2:
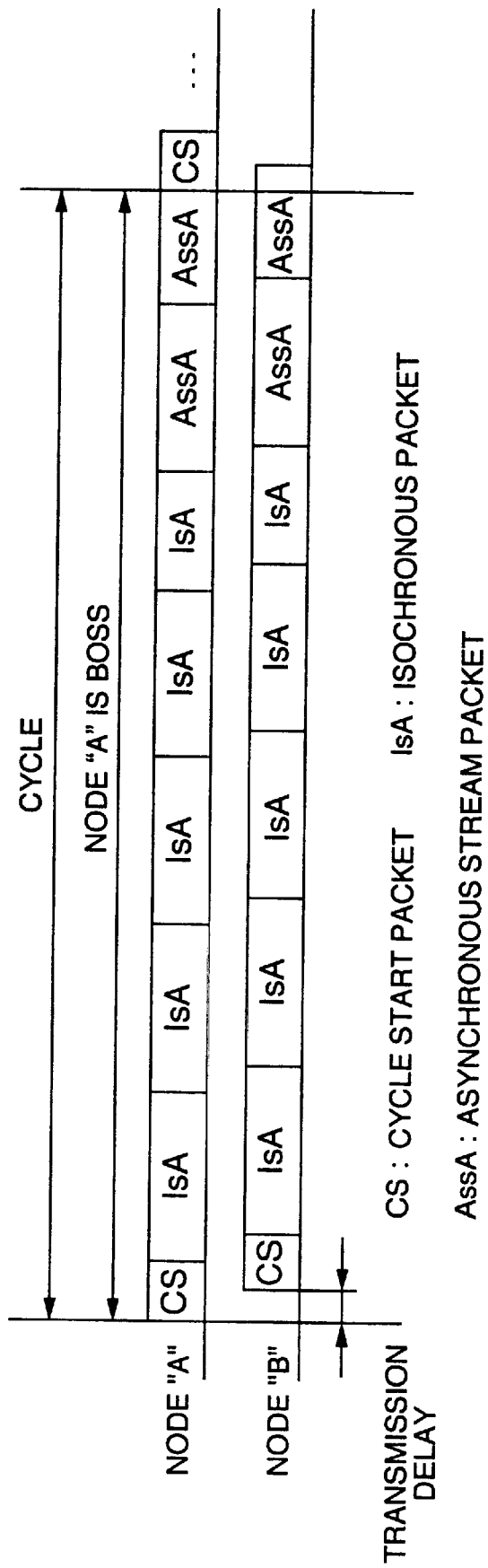
FIG. 2 is a diagram showing an example of the transmission timings of the network system shown in FIG. 1.

FIG. 1 is a diagram showing a network system according to the first embodiment of the present invention, and FIG. 2 is a diagram showing an example of the transmission timings of the network system. In the network system shown in FIG. 1, two nodes "A" and "B" are connected via the IEEE1394 bus. The node "A" is always a cycle master and the BOSS. The node "B" operates only as a reception node. Packets to be transmitted are an isochronous packet and an asynchronous stream packet both of which are not required to return an acknowledgement. An asynchronous packet which is required to return the acknowledgement is not transmitted. An apparatus to be used as a node is, for example, a DVD recorder/player, a digital video tape recorder, a set-top box, an MD recorder/player, a television receiver, a personal computer or the like.

As shown in FIG. 2, in the network system configured as above, after the node "A" transmits a cycle start packet CS, it sequentially transmits five isochronous packets IsA on the bus, and thereafter sequentially transmits two asynchronous stream packets AssA on the bus. Each packet transmitted on the bus is received by the node "B" after a lapse of a transmission delay time. In practice, since there is an interframe gap between packets, it is not possible to have the transmission efficiency of 100%. However, if a process at a node does not become a bottle neck, the transmission efficiency can be raised to the theoretical maximum efficiency.

Figure 14:
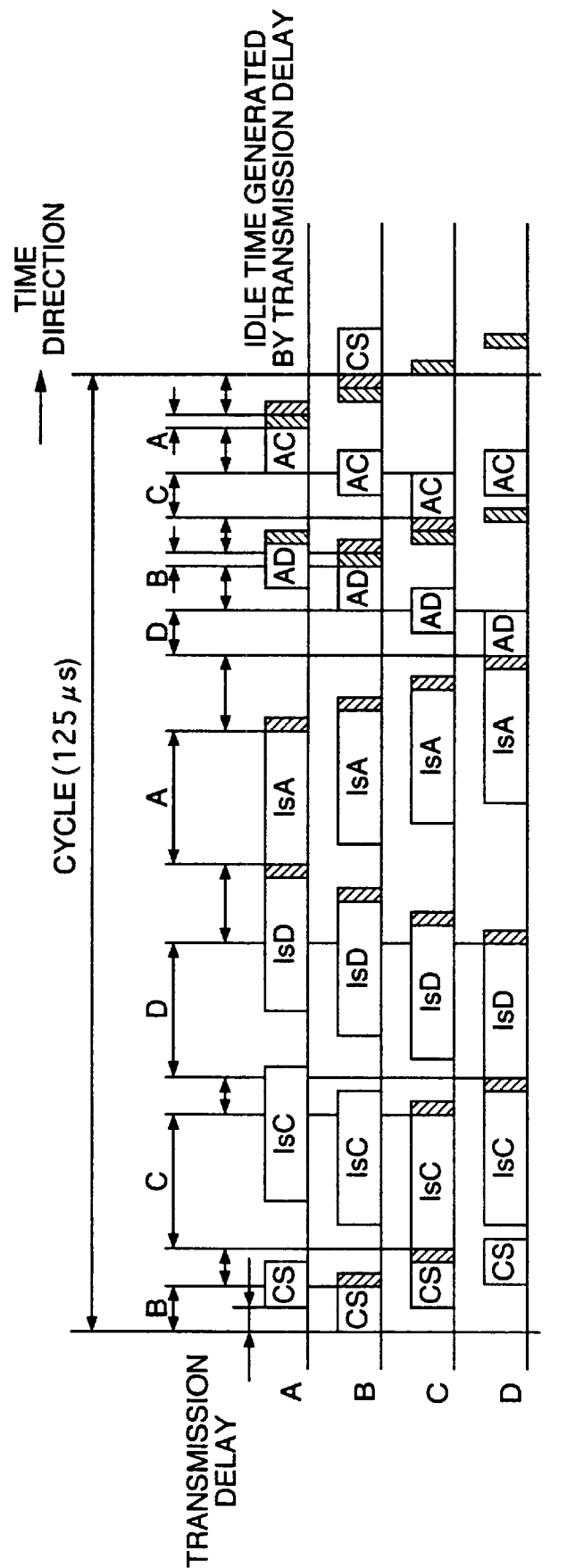
FIG. 14 is a diagram showing an example of transmission timings of the conventional network system.

As above, in the network system according to the first embodiment of the present invention, since the node "B" does not perform a transmission operation, it is not necessary to transmit a transmission permission token from the node "A", which is the cycle master and the BOSS, to the node "B". There is therefore no idle time shown in FIG. 14, so that it is possible to prevent the transmission efficiency from being lowered.

In the embodiment shown in FIG. 1, although one reception node is used, a plurality of reception nodes may be connected to the transmission node "A".

(Second Embodiment)

The second embodiment of the present invention relates to a full-duplex multi-portal bridge having one usual portal, one or more transmission portals and one or more reception portals, and to a network system using such a bridge.

(2-1) Full-duplex 3-Portal Bridge

Figure 3:
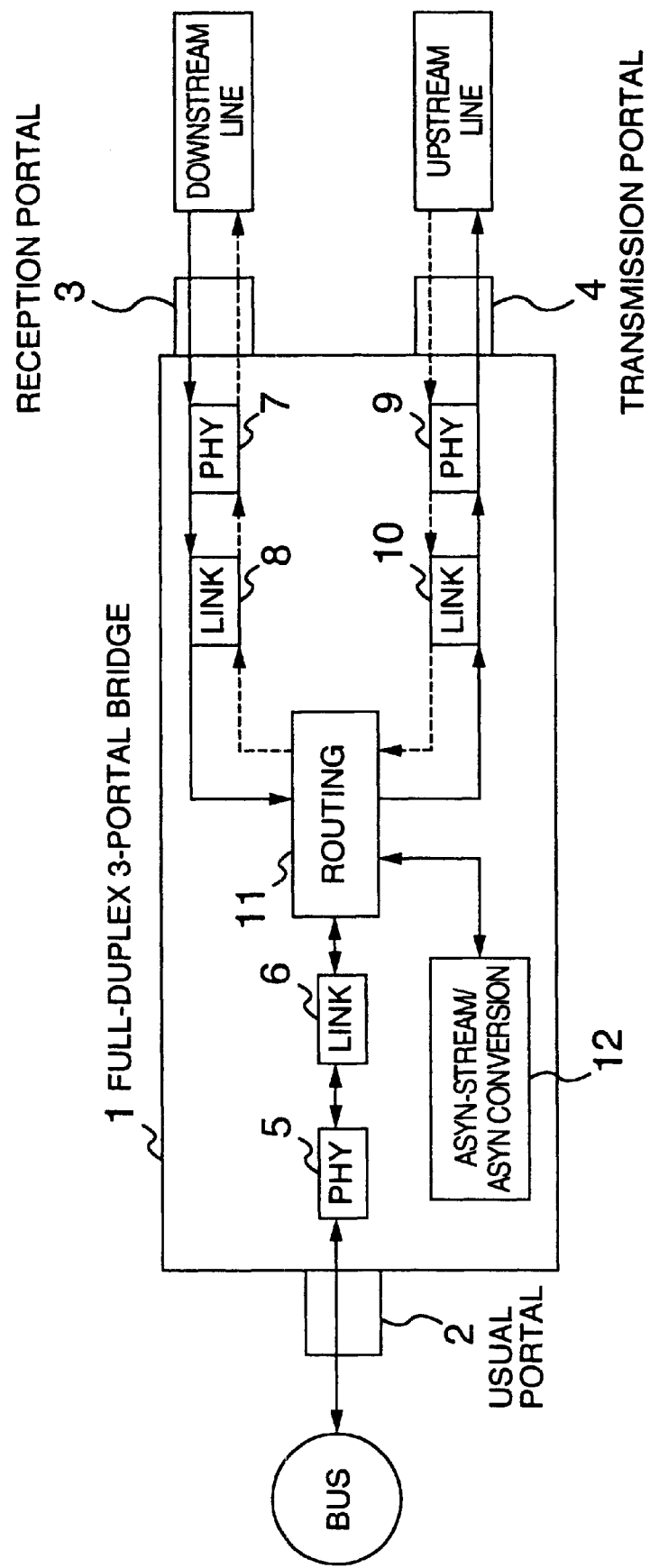
FIG. 3 is a block diagram showing the structure of a full-duplex 3-portal bridge as a network bus bridge according to a second embodiment of the present invention.

FIG. 3 is a block diagram showing the structure of a full-duplex 3-portal bridge used as a network bus bridge according to the second embodiment of the present invention.

As shown in FIG. 3, the full-duplex 3-portal bridge 1 has a usual portal 2, a reception portal 3 and a transmission portal 4 each of which is connected to the IEEE1394 bus. The usual portal 2, the reception portal 3 and the transmission portal 4 are connected to physical layer processing units (PHYs) 5, 7 and 9, respectively. The physical layer processing units 5, 7 and 9 are connected to link-layer processing units (LINKs) 6, 8 and 10, respectively. Aa routing unit 11 and an asynchronous-stream-packet/asynchronous-packet converting unit (Assn-Stream/Assn converting unit) 12 are connected among the link layer processing units 6, 8 and 10.

The usual portal 2 can perform the transmission/reception operations, the reception portal 3 can perform only the reception operation, and the transmission portal 4 can perform only the transmission operation. The usual portal 2 is connected to the bus, the reception portal 3 is connected to a downstream line, and the transmission portal 4 is connected to an upstream line. The physical layer processing units 5, 7 and 9 execute a process for the physical layer of the IEEE1394 bus, and the link layer processing units 6, 8 and 10 execute a process for the link layer thereof. The routing unit 11 executes a routing process for a received packet. If a packet received via the usual portal 2 is an asynchronous packet, the asynchronous-stream-packet/ asynchronous-packet converting unit 12 converts it into an asynchronous stream packet. If a packet received via the usual portal 2 is an asynchronous stream packet converted from an original asynchronous packet, the converting unit 12 converts it into the asynchronous packet. The reception portal 3 and the transmission portal 4 can operate as a usual portal when a failure occurs in the network system. Broken lines in FIG. 3 indicate a data flow during the system failure.

The bridge shown in FIG. 3 includes one transmission portal and one reception portal. However, if the condition that the total throughput of the transmission portals is equal to that of the reception portals is satisfied, the number of the transmission portals and the number of the reception portals are not required to be equal. Further, for example, a relay node including one transmission portal and one reception portal may be used, or a node which includes one transmission portal and a plurality of usual portals and operates as a usual bridge between the usual portals may be used. Further, an isochronous-packet/asynchronous-packet converting unit (Iso/Asyn converting unit) which executes a conversion between an isochronous packet and an asynchronous packet may be provided. Furthermore, only the blocks pertaining to the connection between the networks are shown in FIG. 3. However, for example, a recorder/player, a television tuner, a display, or another apparatus, respectively for isochronous data (Iso data), may be used to realize a DVD recorder/ player, a set-top box, or a television receiver, respectively provided with a bridge function.

(2-2) Network System with Full-duplex 3-Portal Bridge

Figure 4A:
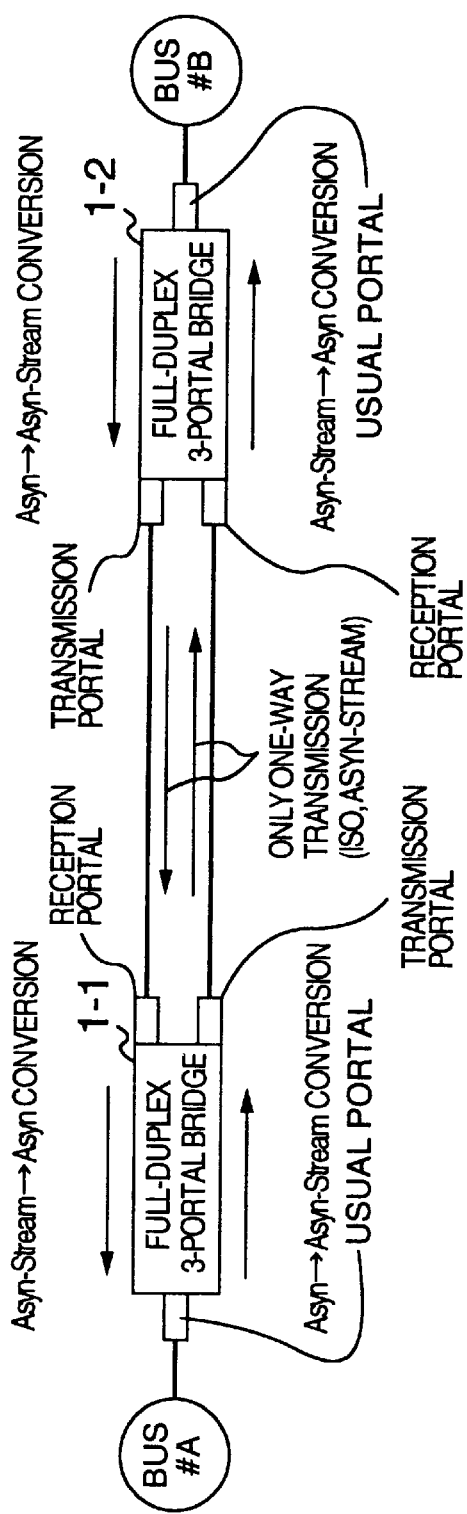
FIGS. 4A and 4B are diagrams showing the structure of a network system having the full-duplex 3-portal bridge shown in FIG. 3.
Figure 4B:
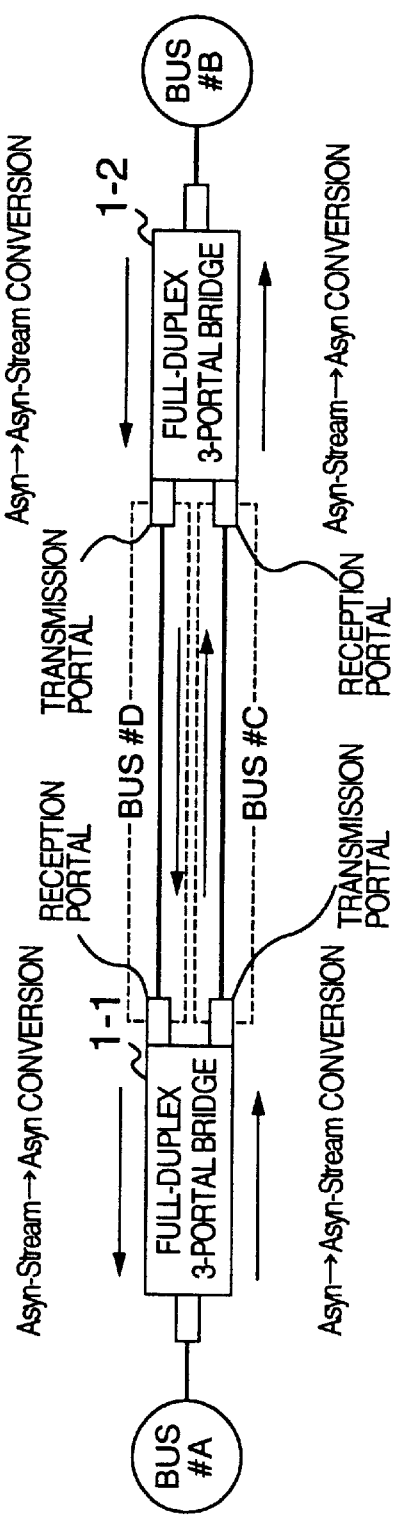

FIGS. 4A and 4B are diagrams showing an example of a network system having the full-duplex 3-portal bridge shown in FIG. 3. FIG. 4A illustrates a connection relation and a data flow, and FIG. 4B shows a bus formed between two bridges.

This network system has a first full-duplex 3-portal bridge 1-1, a second full-duplex 3-portal bridge 1-2, a bus #A, and a bus #B. A usual portal of the first full-duplex 3-portal bridge 1-1 is connected to the bus #A, and a usual portal of the second full-duplex 3-portal bridge 1-2 is connected to the bus #B. Transmission and reception portals of the first full-duplex 3-portal bridge 1-1 are connected to reception and transmission portals of the second full-duplex 3-portal bridge 1-2, respectively. A bus #C is provided between the transmission portal of the first full-duplex 3-portal bridge 1-1 and the reception portal of the second full-duplex 3-portal bridge 1-2. A bus #D is provided between the transmission portal of the second full-duplex 3-portal bridge 1-2 and the reception portal of the first full-duplex 3-portal bridge 1-1. The transmission portal continues to be the cycle maser and the BOSS. Generally, the reception portal does not become the BOSS.

In the network system configured as above, the two-way transmission of the isochronous packets, asynchronous packets and asynchronous stream packets is performed between the bus #A and the usual portal of the first full-duplex 3-portal bridge 1-1. Similarly, the two-way transmission of the isochronous packets, asynchronous packets and asynchronous stream packets is performed between the bus #B and the usual portal of the second full-duplex 3-portal bridge 1-2. Further, the one-way transmission of the isochronous packets and asynchronous stream packets is performed between the transmission portal of the first full-duplex 3-portal bridge 1-1 and the reception portal of the second full-duplex 3-portal bridge 1-2. Similarly, the one-way transmission of the isochronous packets and asynchronous stream packets is performed between the transmission portal of the second full-duplex 3-portal bridge 1-2 and the reception portal of the first full-duplex 3-portal bridge 1-1. The first and second full-duplex 3-portal bridges 1-1 and 1-2 execute the conversion between the asynchronous stream packet and the asynchronous packet if necessary.

Next, the operation of the network system shown in FIGS. 4A and 4B will be described with reference to FIGS. 5A and 5B.

First, the initial operation of the network system shown in FIGS. 5A and 5B will be described.

The transmission portal 4-1 of the first full-duplex 3-portal bridge 1-1 and the reception portal 3-2 of the second full-duplex 3-portal bridge 1-2 are first connected via a cable. Thereby, a bus reset is generated. In a tree-ID process, the transmission portal 4-1 becomes the cycle master. The case that the transmission portal 4-1 cannot become the cycle master will be later described. A self-ID process is performed to establish a bus. This bus is called a bus #C.

The transmission portal 4-1 and the reception portal 3-2 negotiate each other via the bus #C to confirm the following two facts. When a full-duplex communication becomes possible, the transmission portal 4-1 becomes a transmission portal and the reception portal 3-2 becomes a reception portal. Since the reception portal 3-1 and the transmission portal 4-2 have not connected yet, the full-duplex communication has still not been possible.

In this case, it is not necessary to predetermine which one of the transmission portal 4-1 and the reception portal 3-2 becomes a transmission portal and the other becomes a reception portal. This may be determined dynamically during the negotiation. If the transmission portal 4-1 has not become the cycle master, the bus reset is generated so that the transmission portal 4-1 becomes the cycle master. After the above-described confirmation, the connection between the transmission portal 4-1 and the reception portal 3-2 functions as a usual half-duplex bus until the transmission portal 4-2 and the reception portal 3-1 are connected.

Next, the transmission portal 4-2 and the reception portal 3-1 are connected via a cable. Thereby, the bus reset is generated. In the tree-ID process, the transmission portal 4-2 becomes the cycle master. The case that the transmission portal 4-2 cannot become the cycle master will be later described. The self-ID process is performed to establish a bus. This bus is called a bus #D.

The transmission portal 4-2 and the reception portal 3-1 negotiate each other via the bus #D to confirm the following facts. When a full-duplex communication becomes possible, the transmission portal 4-2 becomes a transmission portal and the reception portal 3-1 becomes a reception portal. Since the transmission portal 4-1 and the reception portal 3-2 have already been connected and the negotiation has been completed, the full-duplex communication is possible.

In this case, it is not necessary to predetermine which one of the transmission portal 4-2 and the reception portal 3-1 becomes a transmission portal and the other becomes a reception portal. This may be determined dynamically during the negotiation by taking into consideration the relation between the transmission portal 4-1 and the reception portal 3-2. If the transmission portal 4-2 has not become the cycle master, the bus reset is generated so that the transmission portal 4-2 becomes the cycle master. Thereafter, confirmation is made to start the full-duplex communication by using the buses #C and #D as the one-way buses.

Next, the transmission operation will be described with reference to FIG. 5A.

A packet is transmitted from the bus #A to the usual portal 2-1 of the first dull-duplex 3-portal bridge 1-1. This packet is input to the routing unit 11-1 via the physical layer processing unit (PHY) 5-1 and the link layer processing unit (LINK) 6-1.

If the destination of the packet is not the bus #B, the routing unit 11-1 discards the packet, whereas if the destination of the packet is the bus #B, the routing unit 11-1 identifies the type of the packet. If it is judged that the packet is an asynchronous packet, this packet is converted into an asynchronous stream packet by the asynchronous-stream-packet/asynchronous-packet converting unit (Asyn-Stream/Asyn converting unit) 12-1. This converted asynchronous stream packet is transmitted to the bus #C via the link layer processing unit (LINK) 10-1, the -physical layer processing unit (PHY) 9-1 and the transmission portal 4-1. On the other hand, if the routing unit 11-1 judges that the packet is an isochronous packet or an asynchronous stream packet, this packet is directly transmitted to the bus #C via the link layer processing unit 10-1, the physical layer processing unit 9-1 and the transmission portal 4-1.

The packet transmitted to the bus #C is input from the reception portal 3-2 of the second full-duplex 3-portal bridge 1-2 to the inside of this bridge, and then is transmitted from the usual portal thereof to the bus #B. In this case, the operation of the second full-duplex 3-portal bridge 1-2 is similar to a reception operation of the first full-duplex 3-portal bridge 1-1, which is described in the following with reference to FIG. 5B.

The reception operation will be described with reference to FIG. 5B. A packet is transmitted from the bus #D to the reception portal 3-1 of the first dull-duplex 3-portal bridge 1-1. This packet is input to the routing unit 11-1 via the physical layer processing unit 7-1 and the link layer processing unit 8-1.

If the destination of the packet is not the bus #A, the routing unit 11-1 discards the packet, whereas if the destination of the packet is the bus #A, the routing unit 11-1 identifies the type of the packet. If it is judged that the packet is an asynchronous stream packet converted from an original asynchronous packet, this packet is converted into an asynchronous packet by the asynchronous-stream-packet/asynchronous-packet converting unit 12-1. This converted asynchronous packet is transmitted to the bus #A via the link layer processing unit 6-1, the physical layer processing unit 5-1 and the usual portal 2-1. On the other hand, if the routing unit 11-1 judges that the packet is an isochronous packet or an original asynchronous stream packet, this packet is directly transmitted to the bus #A via the link layer processing unit 6-1, the physical layer processing unit 5-1 and the usual portal 2-1.

Figure 6A:
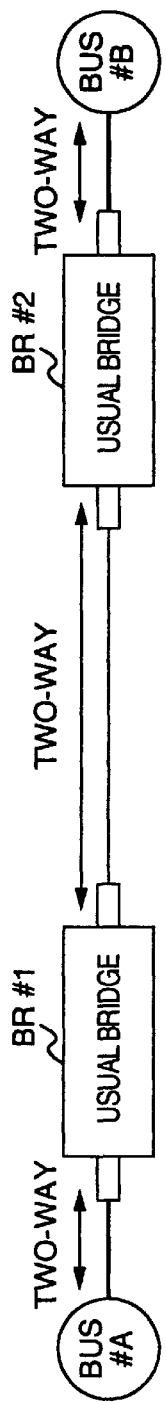
FIGS. 6A–6D are diagrams illustrating the comparison between a network system using a usual bridge and the network system shown in FIGS. 4A and 4B.
Figure 6B:
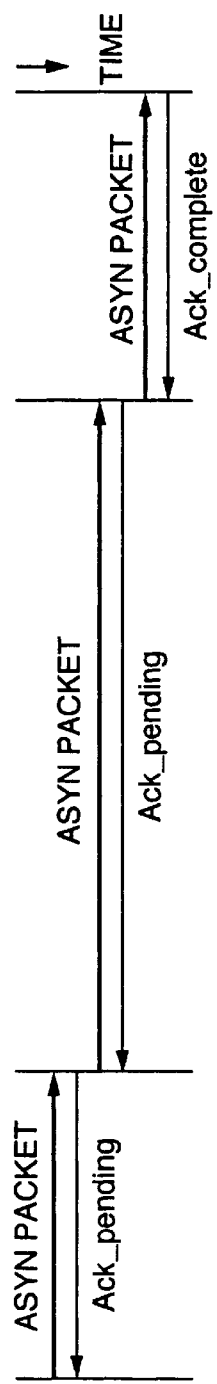
Figure 6C:
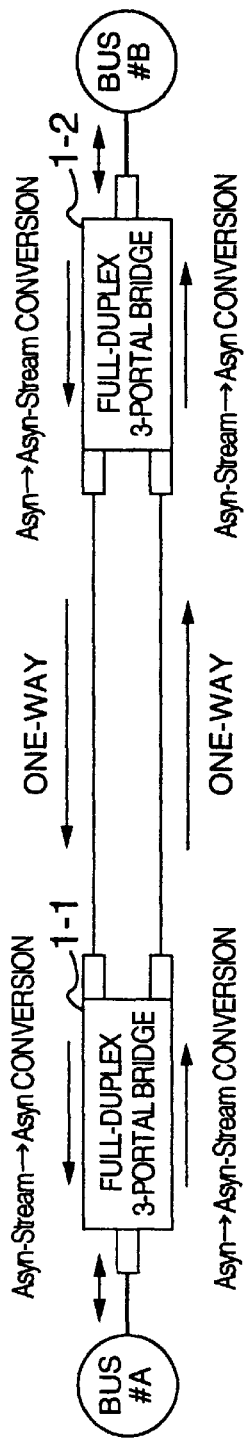
Figure 6D:
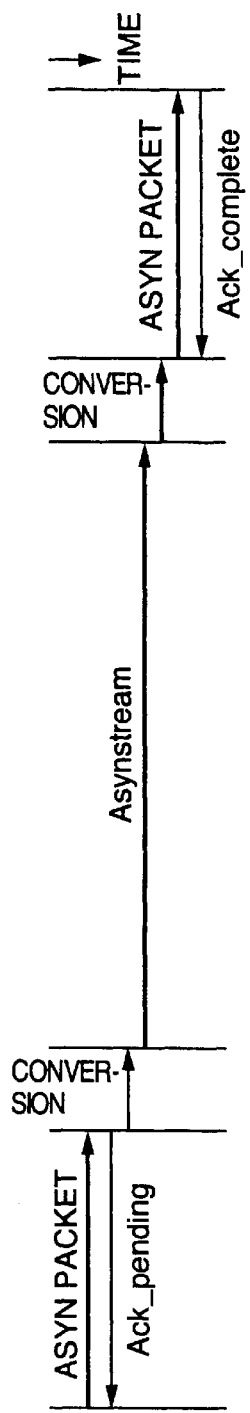

FIGS. 6A–6D are diagrams illustrating the comparison between a network system using a usual bridge and the network system shown in FIGS. 4A and 4B. FIG. 6A shows the structure of the network system using the usual bridge, and FIG. 6B illustrates the operation of the network system while an asynchronous packet is transmitted. FIG. 6C shows the structure of the network system shown in FIGS. 4A and 4B, and FIG. 6D illustrates the operation of the network system while an asynchronous packet is transmitted.

As shown in FIGS. 6A and 6B, if an asynchronous packet is to be transmitted from the bus #A to the bus #B, it is transmitted from the bus #A to a usual bridge BR#1. After the usual bridge BR#1 returns an acknowledge packet (Ack_pending) to the bus #A, it transmits the asynchronous packet to a usual bridge BR#2. After the usual bridge BR#2 returns an acknowledge packet (Ack_pending) to the usual bridge BR#1, it transmits the asynchronous packet to the bus #B. After the bus #B receives the asynchronous packet, it returns an acknowledge packet (Ack complete) to the usual bridge BR#2.

In this embodiment shown in FIGS. 6C and 6D, an asynchronous stream packet is transmitted between the full-duplex 3-portal bridges 1-1 and 1-2. Although the full-duplex 3-portal bridges 1-1 and 1-2 convert a packet, they do not return the acknowledge packet (Ack_pending), so that this network system has the transmission efficiency higher than that of the network system using the usual bridge. The network system of this embodiment can perform the full-duplex communication whose transmission efficiency is not lowered. The bus can be made to have a long distance without lowering the transmission efficiency.

FIGS. 7A and 7B are diagrams illustrating the operation of the network system shown in FIGS. 5A and 5B to be executed when a failure occurs in the network system. FIG. 7A illustrates the state of the network system immediately before the failure occurs, and FIG. 7B illustrates the state of the network system after the failure is coped with.

As shown in FIG. 7A, in the state that the one-way transmission is possible between the transmission portal 4-1 of the first full-duplex 3-portal bridge 1-1 and the reception portal 3-2 of the second full-duplex 3-portal bridge 1-2 and that the one-way transmission is possible between the transmission portal 4-2 of the second full-duplex 3-portal bridge 1-2 and the reception portal 3-1 of the first full-duplex 3-portal bridge 1-1, it is assumed that the cable between the transmission portal 4-2 and the reception portal 3-1 is disconnected and data cannot be transmitted therebetween.

In this case, when the first and second full-duplex 3-portal bridges 1-1 and 1-2 know that the connection between the reception portal 3-1 and the transmission portal 4-2 is broken, the bridges 1-1 and 1-2 change the transmission portal 4-1 and the reception portal 3-2 to the usual portals. As a result, it becomes possible to perform the half-duplex two-way transmission between these portals, as shown in FIG. 7B.

FIGS. 8A and 8B are diagrams showing another structure of the network system having the full-duplex 3-portal bridge shown in FIG. 3. This network system is a loop type network system configured by four full-duplex 3-portal bridges 1-1, 1-2, 1-3 and 1-4. It is assumed that in the state that the loop is formed as shown in FIG. 8A, a failure occurs in one full-duplex 3-portal bridge 1-4 to cut the loop. The transmission and reception portals of the other three full-duplex 3-portal bridges 1-1, 1-2 and 1-3 become the usual portals, so that it is possible to perform the half-duplex two-way transmission among the three full-duplex 3-portal bridges 1-1, 1-2 and 1-3. In other words, although the network system shown in FIGS. 7A and 7B can deal with only the disconnection of the cable, this network system shown in FIGS. 8A and 8B can advantageously deal with also the failure of the node.

In FIGS. 8A and 8B, although the loop is formed by four bridges, it may be formed three or more bridges. Further, a net type of network system as shown in FIG. 9 may be used.

Next, a method of detecting the failure of the node will be described. The failure is detected in the following manner. In one failure detection method, a node located near to a failed node detects the failure to notify it to other nodes. In another failure detection method, a connection confirmation packet is periodically circulated in the loop so that any failure can be detected if the packet is not circulated. In order to locate a failure site, the packet is sent in the one-way direction and a node received the packet returns a response, similar to the trace root. Thereby, it is possible to locate the failure site by checking where the response is not returned. As the failure site is located and it is confirmed that the loop is already out of function, this effect is declared on the original loop. Thereafter, the one-way transmission is not performed and the bus is used as a usual bus.

The above-procedure somewhat complicated may not be used. Use of a bus in the one-way is completely dependent upon that the reception node does not transmit data. If the reception node starts transmission, the one-way communication is broken. Therefore, if the most downstream node which detects the failure starts transmission toward an upstream direction, the one-way communication is broken at this time and it is possible to know that the loop is abnormal, and the bus is automatically changed to the usual bus. This means that the one-way communication is broken and the loop cannot be used when a reception node starts transmission by any reason not limited only to the node failure. A downstream direction is a direction of a packet flowing on the loop when the loop is completed, and the upstream direction is a direction opposite to the downstream direction.

Next, the operation of the loop type network system shown in FIGS. 8A and 8B will be described in detail with reference to FIGS. 10A and 10B.

First, the initial operation of the loop type network system shown in FIGS. 8A and 8B will be described.

Consider now that the transmission portal 4-1 of the first full-duplex 3-portal bridge 1-1 is connected to the reception portal 3-2 of the second full-duplex 3-portal bridge 1-2, and that the reception portal 3-1 of the first full-duplex 3-portal bridge 1-1 is connected to the transmission portal 4-4 of the fourth full-duplex 3-portal bridge 1-4.

First, the transmission portal 4-1 of the first full-duplex 3-portal bridge 1-1 is connected via the cable to the reception portal 3-2 of the second full-duplex 3-portal bridge 1-2. Thereby, the bus reset is generated. In the tree-ID process, the transmission portal 4-1 becomes the cycle master. The case that the transmission portal 4-1 cannot become the cycle master will be later described. The self-ID process is performed to establish a bus. This bus is called a bus #C.

The transmission portal 4-1 and the reception portal 3-2 negotiate each other via the bus #C. When the loop is established, it is confirmed that the transmission portal 4-1 becomes a transmission portal and the reception portal 3-2 becomes a reception portal. In this case, it is not necessary to predetermine which one of the transmission portal 4-1 and the reception portal 3-2 becomes a transmission portal and the other becomes a reception portal. This may be determined dynamically during the negotiation by taking into consideration the relation between nodes on a bus constituting another portion of the loop.

If the transmission portal 4-1 has not become the cycle master, the bus reset is generated so that the transmission portal 4-1 becomes the cycle master. Next, it is confirmed whether or not the loop is established. It is herein assumed that the loop has not established yet (in this example, there is no connection between the reception portal 3-1 and the transmission portal 4-4). It is therefore confirmed that the loop has not established yet. The procedure of confirming whether or not the loop is established will be later described. After this confirmation, the bus between the transmission portal 4-1 and the reception portal 3-2 operates as the usual bus until the loop is established.

Next, the reception portal 3-1 of the first full-duplex 3-portal bridge 1-1 is connected via the cable to the transmission portal 4-4 of the fourth full-duplex 3-portal bridge 1-4. Thereby, the bus reset is generated. In the tree-ID process, the transmission portal 4-4 becomes the cycle master. The case that the transmission portal 4-4 cannot become the cycle master will be later described. The self-ID process is performed to establish a bus. This bus is called a bus #D.

The transmission portal 4-4 and the reception portal 3-1 negotiate each other via the bus #D. It is confirmed that the transmission portal 4-4 becomes a transmission portal and the reception portal 3-1 becomes a reception portal, when a loop is established. In this case, it is not necessary to predetermine which one of the transmission portal 4-4 and the reception portal 3-1 becomes a transmission portal and the other becomes a reception portal. This may be determined dynamically during the negotiation by taking into consideration the relation between nodes on a bus constituting another portion of the loop.

If the transmission portal 4-4 has not become the cycle master, the bus reset is generated so that the transmission portal 4-4 becomes the cycle master. Next, it is confirmed whether or not the loop is established. The procedure of confirming whether or not the loop is established will be later described.

If it is confirmed that the loop is established, information to the effect that the loop has been established and the loop type transmission starts is transmitted. When this information is transmitted, in this example, the buses #C and #D are used as the one-way buses to form the loop.

As the method of confirming whether or not the loop is established, there are the following methods.

One method is to confirm the end of the loop. Since the node has the transmission and reception portals, it is possible to confirm that the node is an "end" if one or both of the transmission and reception portals are not connected. The instant when the loop is completed corresponds to the instant when the node which has been the "end" does not become the "end". The node which recognizes that it is not the "end", flows a loop detection packet in the downstream direction.

A node received this packet flows the packet in the downstream direction if the node is not the "end". If the packet returns from the upstream node to the node first issued the packet, it can be recognized that the loop has been established.

The node which is the "end" returns in the upstream direction a packet indicating that the loop has not established yet. When this packet is received from the downstream node, it can be recognized that the loop has not established yet.

With this confirmation method, however, only a single independent loop can be recognized. In order to recognize the establishment of a loop in which a plurality of loops share a portion of the loop (such as shown in FIG. 9), a more devised method is required. There are two following methods for dealing with such case.

One countermeasure is a method of utilizing a "loop ID" or specific information which can be substituted for the loop ID (such as a list of nodes in the loop), each loop. If the loop ID is added to the loop detection packet to explicitly indicate the loop to be detected, then each loop can be dealt with as if it is independent. With this countermeasure, however, it is necessary to frequently exchange information such as information about whether a subject node is contained in which loop, information about what loop is to be established, information about how respective loops are routed, and other information.

For example, it is assumed that one loop LO#A has already established and a next loop is now under establishment. A proper ID different from that of LO#A is added to the loop detection packet. The rules of adding the ID includes: preparing sufficiently large numbers; randomly selecting these numbers; preparing IDs distinguishing between established loops and still not established loops; and the like. A server for managing IDs of existing loops may be provided. It is herein assumed that the loop now under establishment is LO#B. The packet is then flowed to the downstream side. Upon reception of a packet for detecting the loop LO#B, a node which receives the packet flows it to all of the downstream sides. Each of nodes which are contained in the loop LO#A adds to the packet a mark indicating that the node is contained in the loop LO#A. On the other hand, each of nodes which are not contained in the loop LO#A adds to the packet a mark indicating that the packet has passed through the route which is not contained in the loop LO#A. Thereby, it can be recognized that a new loop has been established in the following case. The packet which circulates around the loop and returns from the upstream side has the mark indicating that the packet has passed through a route which is not contained in the existing loop, or has the mark indicating that the packet has passed through the route which is contained in the loop different from the loop LO#A.

Another countermeasure is a method which does not consider whether or not a node is contained in how many loops. The node recognizes only whether or not it is contained in at least one loop or whether or not it is contained in no loop. The loop detection packet is flowed to the downstream side. If the packet circulates around the loop and returns to the node, it can be recognized that the node belongs to some loop. In this case, it is not necessary to recognize a route through which the packet has passed.

Attention should be paid to a packet returned from the "end" node, which indicates that "any loop is not established". Only when a node receives from all downstream sides the packet which indicates that "any loop is not established", the node sends to the upstream side the packet which indicates that "any loop is not established". Namely, this operation follows an algorithm similar to so-called "back-track" in search. In this manner, when the node receives from all downstream sides the packet which indicates that "any loop is not established", the node can know that it does not belong to any loop, without using topology information of the network (this is true not only for the node which first transmits the loop detection packet, but also for all downstream nodes).

If the countermeasures for a plurality of loops are incorporated, there is a possibility that the packet does not extinguish for ever. To deal with this, a hop limit is used, a packet received second time is discarded, or other means becomes necessary.

Next, the transmission operation will be described with reference to FIG. 10A.

A packet is transmitted from the bus #A to the usual portal 2-1 of the first full-duplex 3-portal bridge 1-1. This packet is input to the routing unit 11-1 via the physical layer processing unit (PHY) 5-1 and the link layer processing unit (LINK) 6-1.

If the destination of the packet is not the buses #B1 to #B3, the routing unit 11-1 discards the packet, whereas if the destination of the packet is either of the buses #B1 to #B3, the routing unit 11-1 identifies the type of the packet. If it is judged that the packet is an asynchronous packet, this packet is converted into an asynchronous stream packet by the asynchronous-stream-packet/asynchronous-packet converting unit 12-1. This converted asynchronous stream packet is transmitted to the bus #C via the link layer processing unit (LINK) 10-1, the physical layer processing unit (PHY) 9-1 and the transmission portal 4-1. On the other hand, if the routing unit 11-1 judges that the packet is an isochronous packet or an asynchronous stream packet, this packet is directly transmitted to the bus #C via the link layer processing unit (LINK) 10-1, the physical layer processing unit (PHY) 9-1 and the transmission portal 4-1. Instead of determining whether or not the packet is discarded by judging whether or not the destination of the packet is either of the buses #B1 to #B3, it may be determined whether or not the packet is discarded by judging whether or not the destination of the packet is the bus #A.

The packet transmitted to the bus #C is input from the reception portal 3-2 of the second full-duplex 3-portal bridge 1-2 to the inside of the bridge 1-2. The operation of the second full-duplex 3-portal bridge 1-2 is similar to the reception operation of the first full-duplex 3-portal bridge 1-1, which is described in the following with reference to FIG. 10B.

The reception operation will be described with reference to FIG. 10B. A packet is transmitted from the bus #D to the reception portal 3-1 of the first full-duplex 3-portal bridge 1-1. This packet is input to the routing unit 11-1 via the physical layer processing unit (PHY) 7-1 and the link layer processing unit (LINK) 8-1.

If the destination of the packet is the bus #A, the routing unit 11-1 identifies the type of the packet. If it is judged that the packet is an asynchronous stream packet converted from an original asynchronous packet, this packet is converted into an asynchronous packet by the asynchronous-stream-packet/asynchronous-packet converting unit 12-1. This converted asynchronous packet is transmitted to the bus #A via the link layer processing unit (LINK) 6-1, the physical layer processing unit (PHY) 5-1 and the usual portal 2-1. On the other hand, if the routing unit 11-1 judges that the packet is an isochronous packet or an original asynchronous stream packet, this packet is directly transmitted to the bus #A via the link layer processing unit 6-1, the physical layer processing unit 5-1 and the usual portal 2-1. If the destination of the packet is the bus #C, this packet is sent to the bus #C.

As described above, the second embodiment of the present invention has the following technical features (1) to (5).

(1) Since the one-way transmission is performed between the transmission and reception portals by fixing the cycle master and the BOSS, the transmission efficiency can be made as much nearest to 100% as possible.

(2) Since the influence of the transmission delay can be mitigated, the transmission efficiency will not be lowered even for long distance with the elongated cable.

(3) The full-duplex and loop type topologies are incorporated. Further, when the cable is disconnected or the failure occurs in the node, the two-way transmission is performed by changing the transmission and reception portals as the usual transmission/reception portals. Thereby, the resistance to the failure is excellent.

(4) It is possible to form the bridge by using the conventional physical layer processing unit and the conventional link layer processing unit as they are, and adding only means for converting between the asynchronous packet and the asynchronous stream packet.

(5) The network systems of various topologies can be configured.

(Third Embodiment)

The third embodiment of the present invention relates to a one-way bridge having one usual portal and one transmission or reception portal, and to a network system using such bridge.

(3-1) One-way Bridge

Figure 11A:
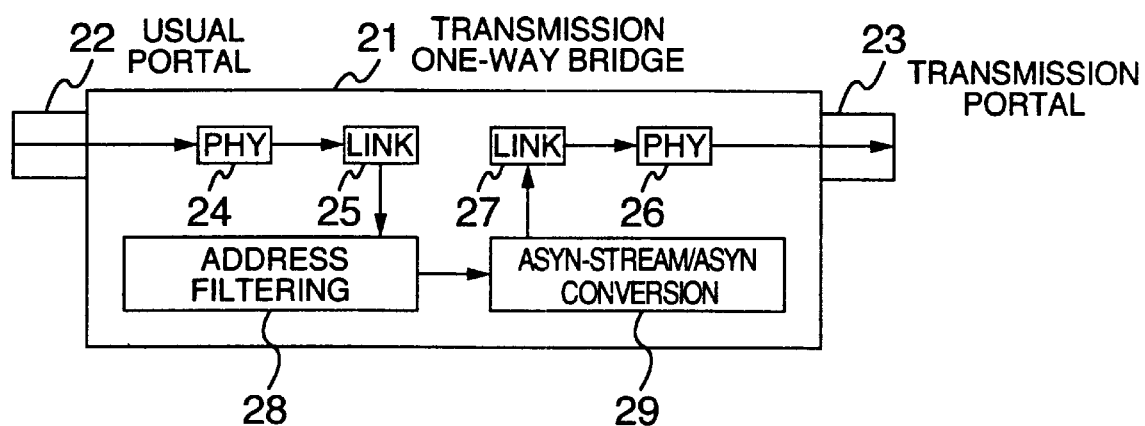
FIGS. 11A and 11B are block diagrams showing the structure of a one-way bridge as a network bus bridge according to a third embodiment of the present invention.
Figure 11B:
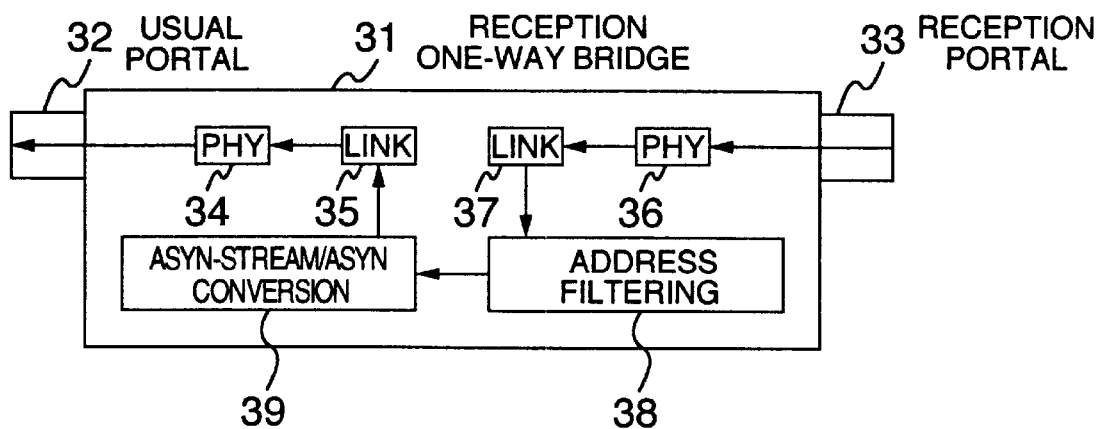

FIGS. 11A and 11B are block diagrams showing the structure of the one-way bridge as the network bus bridge according to the third embodiment of the present invention. FIG. 11A shows a one-way transmission bridge, and FIG. 11B shows a one-way reception bridge.

As shown in FIG. 11A, a one-way transmission bridge 21 has a usual portal 22 and a transmission portal 23 each of which is connected to the IEEE1394 bus. The usual portal 22 and the transmission portal 23 are connected to physical layer processing units (PHY) 24 and 26, respectively. The physical layer processing units (PHY) 24 and 26 are connected to link layer processing units (LINK) 25 and 27, respectively. An address filtering unit 28 and an asynchronous-stream-packet/asynchronous-packet converting unit (Asyn-Stream/Asyn converting unit) 29 are connected between the link layer processing units 25 and 27.

As shown in FIG. 11B, a one-way reception bridge 31 has a usual portal 32 and a reception portal 33 each of which is connected to the IEEE1394 bus. The usual portal 32 and the reception portal 33 are connected to physical layer processing units (PHY) 34 and 36, respectively. The physical layer processing units (PHY) 34 and 36 are connected to link layer processing units (LINK) 35 and 37, respectively. An address filtering unit 38 and an asynchronous-stream-packet/asynchronous-packet converting unit (Asyn-Stream/Asyn converting unit) 39 are connected between the link layer processing units 35 and 37.

In the one-way transmission and reception bridges, the address filtering units 28 and 38 execute the routing of a received packet, similar to the routing unit 11 of the second embodiment. The other constituents have the similar functions to those of the constituents represented by identical reference numerals of the second embodiment.

Although each of the bridges shown in FIGS. 11A and 11B has one usual portal and one transmission or reception portal, the present invention is not limited to this configuration. For example, a relay node having one transmission portal and one reception portal may be used, or a node having one transmission portal and a plurality of usual portals between which the node operates as a usual bridge may be used. Further, an isochronous-packet/asynchronous-packet converting unit for converting between an isochronous packet and an asynchronous packet may be provided. Also, only those blocks pertaining to the network connection are shown in FIGS. 11A and 11B. However, if a recorder/player, a television tuner, a display or another apparatus all of which are for isochronous data is provided, for example, it is possible to realize a DVD recorder/player, a set-top box or a television receiver all of which are provided with a bridge function.

(3-2) Network System with One-way Bridges

Figure 12A:
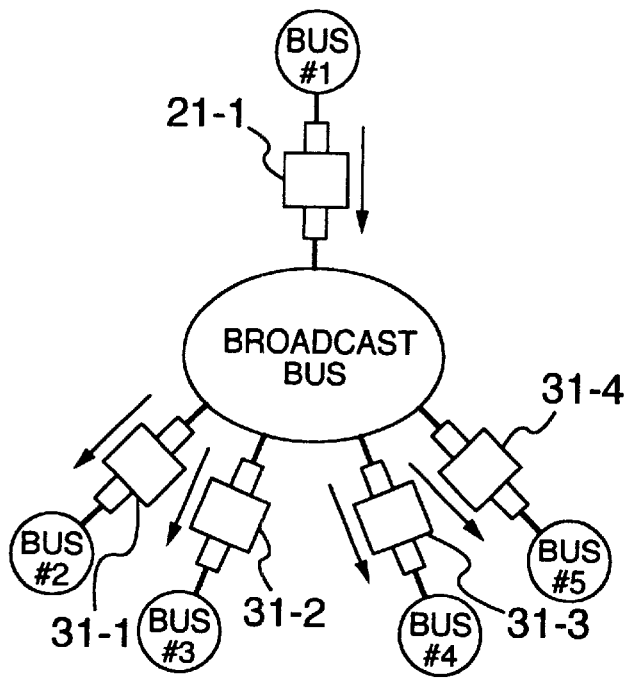
FIGS. 12A and 12B are diagrams showing a network system having the one-way bridge shown in FIGS. 11A and 11B.
Figure 12B:
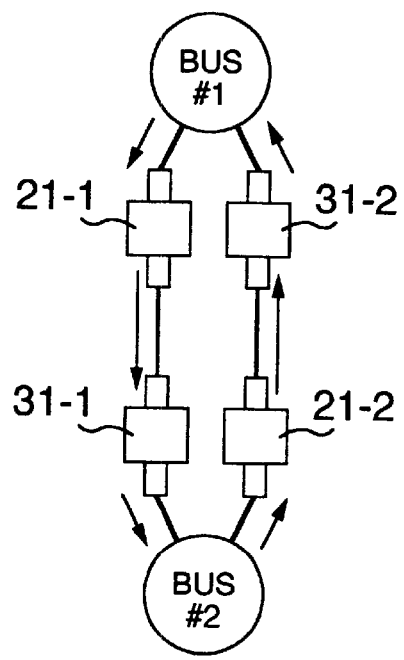
Figure 13:
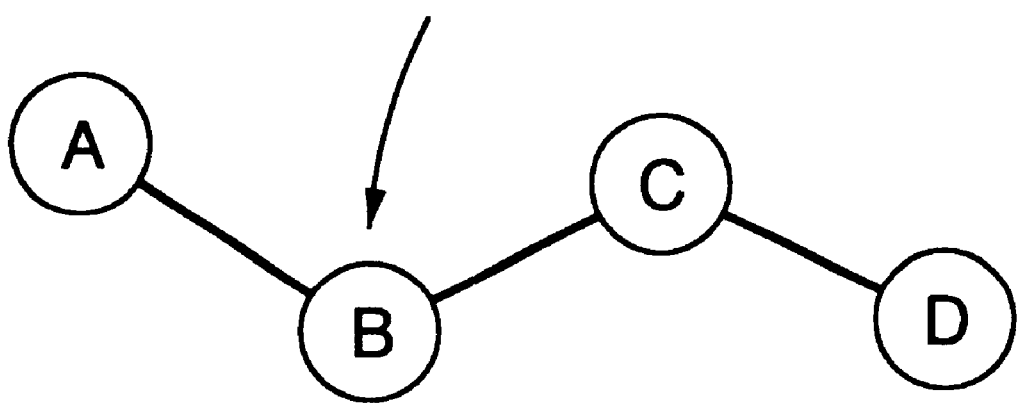
FIG. 13 is a diagram showing an example of a conventional network system.

FIGS. 12A and 12B are diagrams showing a network system using the one-way bridge shown in FIGS. 11A and 11B. The network system shown in FIG. 12A can execute the broadcasting, and the network system shown in FIG. 12B can execute the two-way transmission.

The network system shown in FIG. 12A has one one-way transmission bridge 21-1, four one-way reception bridges 31-1 to 31-4, one broadcasting bus, and five buses #1 to #5. A usual portal of the one-way transmission bridge 21-1 is connected to the bus #1, and the transmission portal thereof is connected to the broadcasting bus. The reception portals of the one-way reception bridges 31-1 to 31-4 are connected to the broadcasting bus, and the usual portals thereof are connected to the buses #2 to #5, respectively. Each transmission portal continues to be the cycle maser and the BOSS. Generally, the reception portal does not become the BOSS.

In the network system configured as above, a packet input from the bus #1 to the one-way transmission bridge 2-1 is input to each of the one-way reception bridges 31-1 to 31-4 via the broadcasting bus, and then is input to the buses #2 to #5 via the one-way reception bridges 31-1 to 31-4. This network system can therefore realize the broadcasting communication without the loss of the transmission efficiency. Further, it is possible to realize the long distance transmission without lowering the transmission efficiency.

The network system shown in FIG. 12B has two one-way transmission bridges 21-1 and 21-2, two one-way reception bridges 31-1 and 31-2, and two buses #1 and #2. Usual portals of the one-way transmission bridges 21-1 and 21-2 are connected to the buses #1 and #2, respectively. Usual portals of the one-way reception bridges 31-1 and 31-2 are connected to the buses #2 and #1, respectively. Transmission portals of the one-way transmission bridges 21-1 and 21-2 are connected to reception portals of the one-way reception bridges 31-1 and 31-2, respectively. Each transmission portal continues to be the cycle maser and the BOSS. Generally, the reception portal does not become the BOSS.

In the network system configured as above, a packet transmitted from the bus #1 is input to the bus #2 via the one-way transmission bridge 21-1 and the one-way reception bridge 31-1. A packet transmitted from the bus #2 is input to the bus #1 via the one-way transmission bridge 21-2 and the one-way reception bridge 31-2. This network system can therefore realize the full-duplex communication without the loss of the transmission efficiency. Further, it is possible to realize the long distance transmission without lowering the transmission efficiency.

In each one-way bridge shown in FIGS. 12A and 12B, when the one-way transmission becomes impossible due to the disconnection of the cable or the failure of the other node in the network system, the half-duplex two-way transmission can be performed by changing the transmission and reception portals to the usual transmission/reception portals to form the usual bridges.

As described above, the third embodiment of the present invention has the following technical features (1) to (4).

(1) Since the one-way transmission is performed between the transmission and reception portals by fixing the cycle master and the BOSS, the transmission efficiency can be made as much nearest to 100% as possible.

(2) Since the influence of the transmission delay can be mitigated, the transmission efficiency will not be lowered even for long distance with the elongated cable.

(3) The full-duplex and loop type topologies are incorporated. Further, when the cable is disconnected or the failure occurs in the node, the two-way transmission is performed by changing the transmission and reception portals as the usual transmission/reception portals. Thereby, the resistance to the failure is excellent.

(4) It is possible to form the bridge by using the conventional physical layer processing units and the conventional link layer processing unit as they are, and adding only means for converting between the asynchronous packet and the asynchronous stream packet. Further, the bridge can be formed by using two portals, so that the structure of the system becomes simpler than the second embodiment.

The present invention is applicable not only to the network system using the IEEE1394 bus but also to other network systems using half-duplex type buses.

As mentioned above, according to the network system of the present invention, the one-way transmission is executed from the transmission node or transmission portal to the reception node or reception portal. It is therefore possible to provide a network system with excellent effects capable of avoiding the bus bandwidth use efficiency from being lowered by the transmission delay to thereby improve the transmission efficiency.

According to the network bus bridge of the present invention, it is possible to provide a network bus bridge with excellent effects capable of executing the one-way transmission to and from a half-duplex bus to thereby improve the transmission efficiency.

Further, according to the network system of the present invention, the one-way transmission from a transmission portal to a reception portal can improve the transmission efficiency. By providing a pair of one-way transmissions in the reverse direction, it becomes possible to provide a network system with excellent effects capable of realizing the two-way transmission with the high transmission efficiency.

According to the network system of the present invention, it is possible to provide a network system with excellent effects capable of improving the transmission efficiency and realizing a loop type transmission by incorporating the one-way transmission from a transmission portal to a reception portal.

What is claimed is:

1. A network system comprising:
   a transmission node;
   one or more reception nodes; and
   a half-duplex bus connected between said transmission node and said one or more reception nodes, for receiving from said transmission node a packet not requiring generation of an acknowledge.

2. The network system according to claim 1, wherein:
   said half-duplex bus is compliant with IEEE1394;
   said transmission node is a cycle master; and
   said transmission node transmits to said half-duplex bus an isochronous packet and an asynchronous stream packet, but not an asynchronous packet.

3. A network system, comprising:
   a transmission node;
   one or more reception nodes; and
   a half-duplex bus connected between said transmission node and said one or more reception nodes, wherein:
   when a failure occurs in the network, said transmission node and said reception nodes become transmission/reception nodes.

4. A network system, comprising:
   a transmission node;
   one or more reception nodes; and
   a half-duplex bus connected between said transmission node and said one or more reception nodes, wherein:
   said half-duplex bus is compliant with IEEE1394,
   said transmission node is a cycle master, and
   when a failure occurs in the network, said transmission node and said reception nodes become transmission/reception nodes.

5. A network bus bridge connected to a half-duplex bus, comprising:
   at least one transmission portal; and
   a converter that converts a packet which requires an acknowledge to a packet which does not require an acknowledge, said packet which does not require an acknowledge for being communicated to said half-duplex bus through said at least one transmission portal, whereby no packets requiring acknowledges are transmitted to said half-duplex bus.

6. A network bus bridge, comprising:
   one or more transmission portals, wherein:
   when a failure occurs in a network, said one or more transmission portals becomes a transmission/reception portal.

7. A network bus bridge connected to a half-duplex bus, comprising:
   at least one reception portal; and
   a converter that converts a packet, which does not require an acknowledge, received from said half-duplex bus by said at least one reception portal to a packet which requires an acknowledge, thereby converting a packet received by said at least one reception portal in case the received packet is a packet requiring no acknowledge, that was previously converted from a packet requiring an acknowledge.

8. A network bus bridge connected to a half-duplex bus, comprising one or more reception portals, wherein when a failure occurs in a network, said one or more reception portals becomes a transmission/reception portal.

9. A network system comprising:
   a first network bus bridge having a transmission portal, a transmission/reception portal, and a converter that converts a packet, which requires an acknowledge, received from said transmission/reception portal to a packet which does not require an acknowledge, said packet which does not require an acknowledge for being communicated to said transmission portal;
   a plurality of second network bus bridges each having a reception portal and a transmission/reception portal; and
   a half-duplex bus connected between said transmission portal and said reception portal, wherein:
   no packets requiring acknowledges are transmitted to said half-duplex bus by said transmission portal.

10. A network system comprising:
    a first network bus bridge having a transmission portal, a transmission/reception portal, and a converter that converts a packet, which requires an acknowledge, received by said transmission/reception portal into a packet which does not require an acknowledge, for being communicated by said transmission portal;
    a second network bus bridge having a reception portal and a transmission/reception portal;
    a third network bus bridge having a transmission portal, a transmission/reception portal, and a converter that converts a packet, which requires an acknowledge, received by said transmission/reception portal of said third network bus bridge into a packet which does not require an acknowledge, for being communicated by said transmission portal of said third network bridge; and a fourth network bus bridge having a reception portal and a transmission/reception portal, wherein:

said transmission portal of said first network bus bridge and said reception portal of said second network bus bridge are connected via a half-duplex bus;

said transmission portal of said third network bus bridge and said reception portal of said fourth network bus bridge are connected via a half-duplex bus;

said transmission/reception portal of said first network bus bridge and said transmission/reception portal of said fourth network bus bridge are connected via a half-duplex buss and said transmission/reception portal of said second network bus bridge and said transmission/reception portal of said third network bus bridge are connected via a half-duplex bus.

11. A network bus bridge connected to a half-duplex bus, comprising:

one or more transmission portals;

one or more reception portals;

a first converter that converts a packet which requires an acknowledge to a packet which does not require an acknowledge, said packet which does not require an acknowledge for being communicated to said half-duplex bus through said one or more transmission portals, whereby no packets requiring acknowledges are transmitted to said half-duplex bus; and a second converter that converts a packet, which does not require an acknowledge, received from said half-duplex bus by said one or more reception portals to a packet which requires an acknowledge, thereby converting a packet received by said one or more reception portals in case the received packet is a packet requiring no acknowledge, that was previously converted from a packet requiring an acknowledge.

12. A network bus bridge connected to a half-duplex bus, comprising:

one or more transmission portals; and one or more reception portals, wherein:

said transmission portals and said reception portals become transmission/reception portals when a failure occurs in a network.

13. A network system, comprising:

two network bus bridges according to claim 11, wherein:

said transmission portals and said reception portals of one of said network bus bridges are connected to said reception portals and said transmission portals of the other of said two network bus bridges via half-duplex buses, respectively.

14. A network system, comprising:

two network bridges that each comprise one or more transmission portals and one or more reception portals, wherein:

said transmission portals and said reception portals become transmission/reception portals when a failure occurs in the network, and said transmission portals and said reception portals of one of said network bus bridges are connected to said reception portals and said transmission portals of the other of said two network bus bridges via half-duplex buses, respectively.

15. A network system, comprising:

three or more network bus bridges according to claim 11, wherein:

said transmission portals and said reception portals of one of two adjacent network bus bridges of said three network bus bridges are connected to said reception portals and said transmission portals of the other of said two adjacent network bus bridges via half-duplex buses, respectively, to form a loop along which data flows in one direction.

16. A network system, comprising:

three or more network bus bridges that each comprise one or A more transmission portals and one or more reception portals, wherein said transmission and reception portals become transmission/reception portals when a failure occurs in the network, said transmission portals and said reception portals of one of two adjacent network bus bridges of said three network bus bridges are connected to said reception portals and said transmission portals of the other of said two adjacent network bus bridges via half-duplex buses, respectively, to form a loop along which data flows in one direction.

17. A network system according to claim 9, wherein if a packet received from said transmission/reception portal of said first network bus bridge is an asynchronous packet compliant with IEEE1394, said converter converts the received packet into an asynchronous stream packet or an isochronous packet to be transmitted from said transmission portal.

18. A network system according to claim 10, wherein if a packet received from said transmission/reception portal of either of said first network bus bridge and said third network bus bridge is an asynchronous packet compliant with IEEE1394, said converter converts the received packet into an asynchronous stream packet or an isochronous packet to be transmitted from said corresponding transmission portal.

19. The network system according to claim 13, wherein each of said two network bus bridges further comprises a transmission/reception portal and if a packet received by either of said two network bus bridges from a respective transmission/reception portal is an asynchronous packet compliant with IEEE1394, one of said first converter and said second converter converts the received packet into an asynchronous stream packet or an isochronous packet to be transmitted from said respective transmission portal.

20. A network system, comprising:

two network bridges that each comprise one or more transmission portals and one or more reception portals, wherein said transmission portals and said reception portals become transmission/reception portals when a failure occurs in the network, said transmission portals and said reception portals of one of said two network bus bridges are connected to said reception portals and said transmission portals of the other of said two network bus bridges via half-duplex buses, respectively, and each of said two network bus bridges further comprises a non-fault-mode transmission/reception portal and if a packet received by either of said two network bus bridges from a respective non-fault-mode transmission/reception portal is an asynchronous packet compliant with IEEE1394, the received packet is converted into an asynchronous stream packet or an isochronous packet to be transmitted from said respective one or more transmission portals.

21. The network system according to claim 15, wherein each of said three or more network bus bridges further comprises a transmission/reception portal and if a packet received by any of said three or more network bus bridges from a respective transmission/reception portal is an asynchronous packet compliant with IEEE1394, one of said first converter and said second converter converts the received packet into an asynchronous stream packet or an isochronous packet to be transmitted from said respective transmission portal.

22. A network system, comprising:

three or more network bus bridges that each comprise one or more transmission portals and one or more reception portals, wherein:

said transmission portals and said reception portals become transmission/reception portals when a failure occurs in the network, said transmission portals and said reception portals of one of two adjacent network bus bridges of said three network bus bridges are connected to said reception portals and said transmission portals of the other of said two adjacent network bus bridges via half-duplex buses, respectively, to form a loop along which data flows in one direction, and if a packet received by any of said three or more network bus bridges from the respective transmission/reception portal is an asynchronous packet compliant with IEEE1394, the received packet is converted into an asynchronous stream packet or an isochronous packet to be transmitted from said respective transmission portal.

23. A network bus bridge, comprising:

a plurality of nodes, one of said nodes being set as a transmission node and at least one of the other nodes being set as a reception node;

a half-duplex bus connected between said one node and said at least one node, for receiving from the transmission node a packet not requiring generation of an acknowledge; and a node setter that sets said one node as said transmission node and said at least one node as said reception node.

24. The network bus bridge according to claim 23, wherein said setter determines said transmission node and said reception node by an inter-node negotiation process.

25. The network system according to claim 23, wherein:

said half-duplex bus is compliant with IEEE1394;

said transmission node is a cycle master; and said transmission node transmits to said half-duplex bus an isochronous packet and an asynchronous stream packet, but not an asynchronous packet.

26. The network bus bridge according to claim 5, wherein said packet which requires an acknowledge is an asynchronous packet and said packet which does not require an acknowledge is an asynchronous stream packet.

27. The network bus bridge according to claim 5, further comprising an address filter and router that provide an indication of packet destination and kind to be provided to said converter for use during conversion of the packet to one not requiring an acknowledge.

28. The network bus bridge according to claim 5, further comprising a plurality of portals including said transmission portal, and a node setter that sets which of said plurality of portals functions as said transmission portal.

29. The network bus bridge according to claim 28, wherein said setter determines which of said plurality of portals functions as said transmission portal by an inter-portal negotiation process.

30. The network bus bridge according to claim 7, wherein said packet which requires an acknowledge is an asynchronous packet and said packet which does not require an acknowledge is an asynchronous stream packet.

31. The network bus bridge according to claim 7, further comprising a plurality of portals including said reception portal, and a node setter that sets which of said plurality of portals functions as said reception portal.

32. The network bus bridge according to claim 31, wherein said setter determines which of said plurality of portals functions as said reception portal by an inter-portal negotiation process.

33. The network bus bridge according to claim 9, wherein said packet which requires an acknowledge is an asynchronous packet and said packet which does not require an acknowledge is an asynchronous stream packet.

34. The network bus bridge according to claim 9, further comprising an address filter and router that provide an indication of packet destination and kind to be provided to said converter for use during conversion of the packet to one not requiring an acknowledge.

35. The network bus bridge according to claim 9, wherein said plurality of second network bus bridges includes a converter that converts a packet, which does not require an acknowledge, received from said half-duplex bus by said reception portal to a packet which requires an acknowledge, thereby converting a packet received by said reception portal in case the received packet is a packet requiring no acknowledge, that was previously converted from a packet requiring an acknowledge.

36. The network bus bridge according to claim 10, wherein each said packet which requires an acknowledge is an asynchronous packet and said packet which does not require an acknowledge is an asynchronous stream packet.

37. The network bus bridge according to claim 10, wherein:

said second network bus bridge includes a converter that converts a packet, which does not require an acknowledge, received by said reception portal of said second network bus bridge to a packet which requires an acknowledge, thereby converting a packet received by said reception portal of said second network bus bridge in case the received packet is a packet requiring no acknowledge, that was previously converted from a packet requiring an acknowledge, and said fourth network bus bridge includes a converter that converts a packet, which does not require an acknowledge, received by said reception portal of said fourth network bus bridge to a packet which requires an acknowledge, thereby converting a packet received by said reception portal of said fourth network bus bridge in case the received packet is a packet requiring no acknowledge, that was previously converted from a packet requiring an acknowledge.

38. The network bus bridge according to claim 11, wherein each said packet which requires an acknowledge is an asynchronous packet and said packet which does not require an acknowledge is an asynchronous stream packet.

39. The network bus bridge according to claim 13, further comprising a negotiation device that negotiates between said respective portals to enable, in accordance with available duplex communication therebetween, one of said portals to function as said reception portal and another one of said portals to function as a reception portal, by an inter-portal negotiation process.

40. The network bus bridge according to claim 15, further comprising a negotiation device that negotiates between said respective portals to enable, in accordance with available duplex communication therebetween, one of said portals to function as said reception portal and another one of said portals to function as a reception portal, by an inter-portal negotiation process.

* * * * *